US012779948B2

(12) United States Patent
Tadele et al.

(10) Patent No.: US 12,779,948 B2
(45) Date of Patent: Nov. 3, 2026

(54) HEATING DEVICE FOR HEATING AN AIR FLOW IN A MOTOR VEHICLE

(71) Applicant: BorgWarner Ludwigsburg GmbH, Ludwigsburg (DE)

(72) Inventors: Sisay Tadele, Friolzheim (DE); Helmut Hoppe, Stuttgart (DE); Alexander Dauth, Maulbronn (DE); Riza Oguz, Esslingen (DE); Martin Dowling, Tralee (IE); Ivan Morris, Glencar (IE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 1136 days.

(21) Appl. No.: 17/835,691

(22) Filed: Jun. 8, 2022

(65) Prior Publication Data

US 2022/0402335 A1 Dec. 22, 2022

(30) Foreign Application Priority Data

Jun. 17, 2021 (DE) ..................... 10 2021 115 747.1

(51) Int. Cl.
*B60H 1/22* (2006.01)
*H05B 1/02* (2006.01)
*H05B 3/50* (2006.01)

(52) U.S. Cl.
CPC ......... *B60H 1/2225* (2013.01); *H05B 1/0236* (2013.01); *H05B 3/50* (2013.01); *H05B 2203/016* (2013.01); *H05B 2203/023* (2013.01)

(58) Field of Classification Search
CPC ................ B60H 1/2225; H05B 1/0236; H05B 2203/016; H05B 2203/023; H05B 3/50
USPC .......................................................... 219/483
See application file for complete search history.

(56) References Cited

U.S. PATENT DOCUMENTS

| | | | | |
|---|---|---|---|---|
| 7,816,630 B2 | 10/2010 | Hamburger et al. | | |
| 7,977,610 B2 | 7/2011 | Hamburger et al. | | |
| 2004/0112884 A1* | 6/2004 | Uhl | ...................... | H05K 1/0206 219/202 |

(Continued)

FOREIGN PATENT DOCUMENTS

| | | | | |
|---|---|---|---|---|
| CN | 1656850 A | * 8/2005 | ........... | B60H 1/2225 |
| CN | 112009202 A | * 12/2020 | ........... | B60H 1/2218 |

(Continued)

OTHER PUBLICATIONS

Machine Translation of CN112009202A (Year: 2025).*
Machine Translation of DE102018116747A1 (Year: 2025).*
Machine Translation of CN1656850A (Year: 2025).*

*Primary Examiner* — John J Norton
*Assistant Examiner* — Thomas J Ward
(74) *Attorney, Agent, or Firm* — Bose McKinney & Evans LLP

(57) ABSTRACT

A heating device for heating an airflow in a motor vehicle is described, with a plurality of heating rods, which have connection plates made of aluminium, or an aluminium-based alloy, and a circuit board, which carries a control circuit, to which the heating rods are connected by way of busbars. In accordance with this disclosure, provision is made for the busbars to have a body made of aluminium, or an aluminium-based alloy, which establishes contact with the heating rods by means of a welded connection, and an end piece made of copper, or a copper-based alloy, which establishes contact with the circuit board by means of a plug-in connector.

10 Claims, 3 Drawing Sheets

(56) References Cited

U.S. PATENT DOCUMENTS

| | | | |
|---|---|---|---|
| 2004/0200829 | A1 | 10/2004 | Hamburger et al. |
| 2006/0138712 | A1 | 6/2006 | Hamburger et al. |

FOREIGN PATENT DOCUMENTS

| | | | | | |
|---|---|---|---|---|---|
| DE | 10 2006 018 784 | B4 | | 12/2007 | |
| DE | 103 33 451 | B4 | | 6/2010 | |
| DE | 102018116747 | A1 | * | 1/2020 | ........... B60H 1/2218 |
| DE | 10 2018 116 747 | B4 | | 2/2020 | |

* cited by examiner

HEATING DEVICE FOR HEATING AN AIR FLOW IN A MOTOR VEHICLE

RELATED APPLICATIONS

This application claims priority to DE 10 2021 115 747.1, filed Jun. 17, 2021, the entire disclosure of which is hereby incorporated herein by reference.

BACKGROUND

This disclosure relates to a heating device for heating an air flow in a motor vehicle. A heating device generally of this type is known, for example, from DE 10 2018 116 747 B4.

Heating devices for heating an air flow are used in motor vehicles to heat the passenger compartment. Such heating devices usually have a plurality of heating rods, which contain PTC resistors and connection plates. Usually, as in the case of the heating device disclosed in DE 103 33 451 B4, these connection plates are designed as contact tongues, which by means of a plug-in connector are electrically connected to the control circuit. In high-voltage applications, an electrically insulated earth connection is required for each heating rod, so that each heating rod has two connection plates. A corresponding number of female plug-in connectors to accommodate the contact tongues is expensive, and requires a relatively large amount of space on the circuit board.

In order to avoid the expense associated with plug-in connectors, and to save space on the circuit board, in the heating device disclosed in DE 10 2018 116 747 B4 the heating rods are connected to a welding contact by way of a series of sheet metal strips and contact pieces, by means of welded connections. The welding contact is brazed onto the circuit board.

SUMMARY

This disclosure provides a way in which heating rods of a heating device for heating an air flow in a motor vehicle can be connected to a control circuit with less expense and space requirement.

In a heating device in accordance with this disclosure, the heating rods are connected by way of busbars to a circuit board, which carries a control circuit. By connecting a plurality of heating rods to the circuit board by way of a busbar, the number of connections on the circuit board can advantageously be reduced. The connection between busbars and circuit board can also be simplified. The busbars have a body made of aluminium, or an aluminium-based alloy, which establishes contact with the heating rods by means of a welded connection, and an end piece made of copper, or a copper-based alloy, which establishes contact with the circuit board by means of a plug-in connector. In this way, a cost-effective and efficient mode of production can be implemented, which enables a form of contact with the heating rods that is suitable for high voltages and high currents.

Busbars with a body made of aluminium, or an aluminium-based alloy, can be manufactured inexpensively and welded to the connection plates of the heating rods without any problems, since the connection plates are also made of aluminium, or an aluminium-based alloy. However, aluminium and aluminium-based alloys are less suitable for a plug-in connector with a low contact resistance. The busbars of a heating device in accordance with this disclosure are therefore provided with an end piece made of copper, or a copper-based alloy, which forms the male part of a plug-in connector, by way of which an electrical contact with the circuit board is established. The end piece is preferably coated, for example with tin, a tin-based alloy, a precious metal, or a precious metal-based alloy.

The body of the busbars and their end piece can be positively connected in a form fit to each other, in particular by a shaping joining process. Particularly suitable are press joining processes, for example blind riveting, self-piercing riveting, toxing, or clinching.

In toxing, a flat, round mandrel presses plates lying on top of each other into a die with a recess. Thereby the plates are shaped and interlock with each other. There are also variants of toxing in which the opposite side remains flat, or in which a rivet is inserted, so that both sides are flat. Clinching works in principle in the same way, except that the die expands during the shaping process, wherein a high-strength and compact joint between different materials is likewise created. In this way, a gas-tight connection can be created between the materials involved, and any oxide layers that may be present can be broken up when joining the materials involved, so that a good electrical connection with a low electrical resistance can be created.

The end piece of the busbars can form a contact tongue, which interacts with a mating part mounted on the circuit board, and forms a plug-in connector. It is also possible for the end piece of the busbars to be designed as a press-in contact, which is pressed into a corresponding opening in the circuit board. The contact pin can have a bulging center section that presses against the metalized inner surfaces of an opening in the circuit board. This contact pin can be of solid design, or can have an opening, such that the bulging center section of the contact pin is formed by two sprung webs, which enclose the opening between them. By providing the center section of the contact pin with such an opening, the force required for pressing in the pin can advantageously be reduced.

Regardless of the specific design of the end piece, the latter can advantageously be inserted into an opening of the circuit board. The contact with the circuit board can be established either by way of a mating part of a plug-in connector, which part is mounted on the side of the circuit board facing away from the busbar, or by way of metalized walls of the opening in the circuit board.

Copper-based alloys are alloys that consist of more than 50% by weight of copper. Aluminium-based alloys are alloys that consist of more than 50% by weight of aluminium. Suitable copper-based alloys for the end piece of the busbar are, for example, CuSn6, CuNiSi and CuZn37. Suitable aluminium-based alloys for the body of the busbar are, for example, Al5754 H22, AlMg3, Al 6082 T6 and AlSi1MgMn.

A further advantageous refinement of this disclosure provides for the end piece of the busbar to be provided with a metallic coating. In this way, the contact resistance of the plug-in connector can be reduced even further, which is a significant advantage, in particular for high-voltage applications. The metallic coating can, for example, consist of tin, or a tin-based alloy.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

Figure 1:
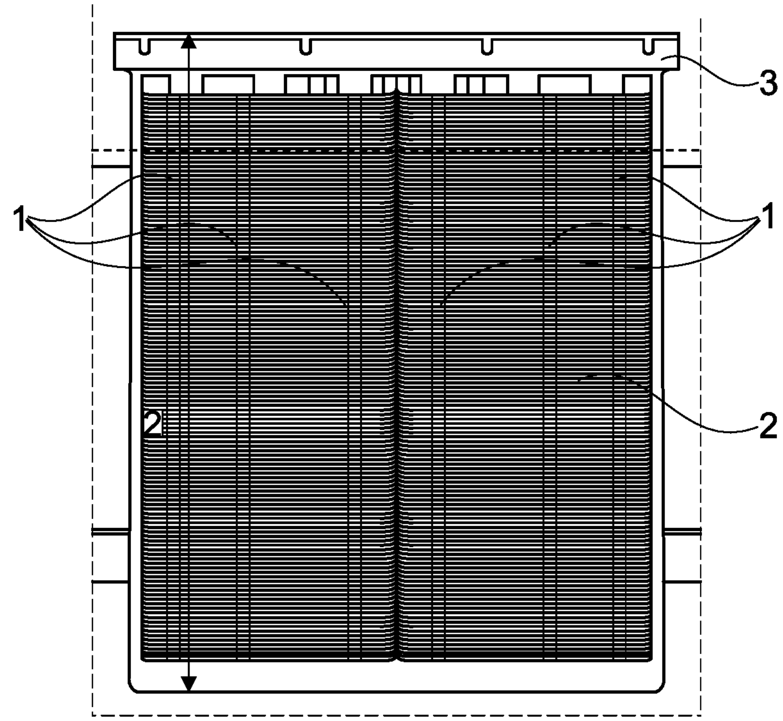
FIG. 1 shows a schematic illustration of a heating device for heating an air flow in a motor vehicle.

The heating device shown in FIG. 1 serves to heat an air flow in a motor vehicle, and can be used, for example, as part of an air conditioning system to heat the passenger compartment. The heating device comprises a plurality of heating rods 1, for example three to eight heating rods, which in each case are connected to heat dissipation elements 2, for example to sheet metal fins pushed onto the heating rods. However, the heat dissipation elements 2 can also be formed integrally with the heating rods 1, as is known in the art, for example, from DE 10 2006 018 784 B4.

Figure 2:
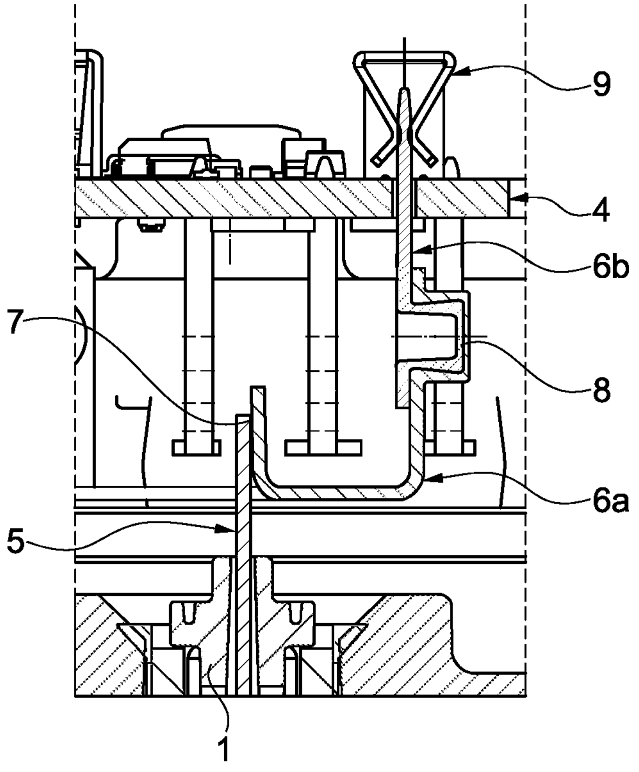
FIG. 2 shows a sectional view of a detail of the heating device, which illustrates the electrical connection between one of the heating rods and a circuit board.

The heating rods 1 project with their connection-side ends into a housing 3, in which they are connected to a control circuit for purposes of controlling the heating function. FIG. 2 shows schematically in a sectional view a detail of the heating device, in which is illustrated the connection of a heating rod 1 to a circuit board 4, which carries the control circuit.

The heating rod 1 has heating resistors (not shown) made of a PTC ceramic, with which contact plates 5 establish electrical contact. Only one of these contact plates 5 is illustrated in FIG. 2. The contact plates 5 are connected to the circuit board 4 by busbars. Only one of these busbars is illustrated in FIG. 2. The busbar has a body **6*a* of an aluminium-based alloy, which is welded at a contact point 7 to the contact plate 5 of an aluminium-based alloy, and an end piece 6*b* of copper, or a copper-based alloy, which is inserted into an opening of the circuit board 4** and establishes electrical contact with the control circuit on the circuit board.

The body **6*a* and the end piece 6*b* of the busbar are positively connected in a form fit to each other at the point 8**, for example by toxing, clinching or another shaping joining process.

In the example shown, the end piece **6*b* of the busbar protrudes through the circuit board 4, and is inserted into a female plug-in connector 9. The end piece 6*b*** thus forms a contact pin, which in this example is designed as a contact tongue.

The end piece **6*b* is provided with a metallic coating, for example, it is tin-plated. In this way, corrosion of the end piece can be prevented, and an advantageously low contact resistance onto the circuit board 4** can be permanently achieved.

Figure 3:
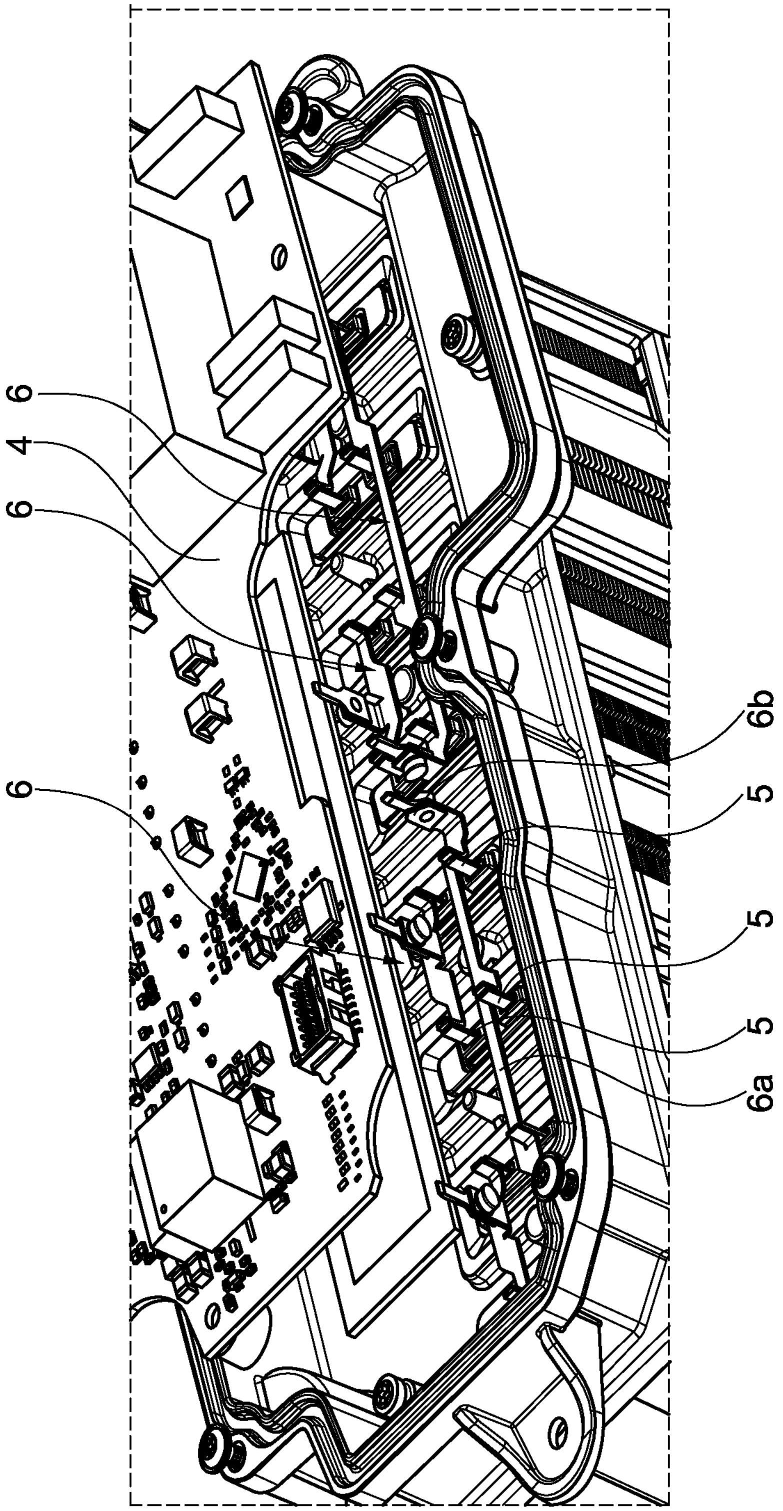
FIG. 3 shows the heating device with the housing open, and the circuit board raised.

FIG. 3 shows the heating device with the housing removed, and the circuit board 4 raised, so that the contact plates 5 of the individual heating rods and the busbars 6 can be seen. As can be seen, each heating rod has two contact plates 5, in each case welded to the body **6*a* of a different busbar 6**. The contact plate for earth is welded to the body of a busbar for earth, and the contact plate for potential is welded to the body of a busbar for potential.

Figure 4:
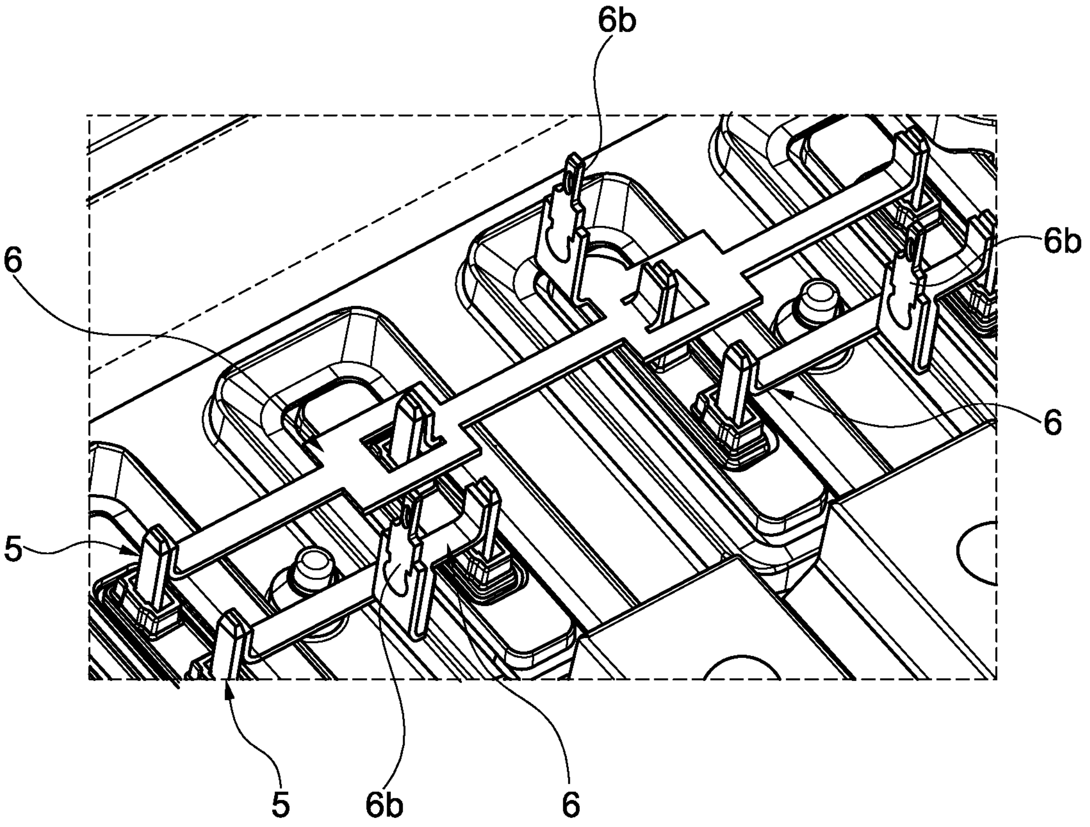
FIG. 4 shows a detail view of a further example of embodiment of a heating device for heating an airflow in a motor vehicle.

FIG. 4 shows a detail view of a further example of embodiment of a heating device for heating an air flow in a motor vehicle, with the housing and circuit board removed. The contact plates 5 of a plurality of heating rods, and the busbars 6 that establish contact with them, can be seen in FIG. 4. The difference from the example of embodiment explained above is limited to the configuration of the end pieces **6*b* of the busbars 6**.

In the example of embodiment in FIG. 4, the end pieces **6*b*** form a contact pin in the form of a press-in contact. The press-in contact forms an electrical contact with metalized walls of a corresponding opening of the circuit board. The press-in contact has a bulging center section, with which contact is established with the metalized walls of an opening of the circuit board. The press-in contact can be of solid design, or can have an opening that is enclosed by spring clips.

The end piece **6*b* is also positively connected in a form fit to the body 6*a* of the busbar 6 in the example of embodiment of FIG. 4. Here the body 6*a* of the busbar 6 forms two arms, which grip the end piece 6*a* on its narrow sides, and engage with a lateral recess of the end piece 6*a***.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE SYMBOLS

1 Heating rod
2 Heat dissipation element
3 Housing
4 Circuit board
5 Contact plate
6 Busbar
**6*a*** Body
**6*b*** End piece
7 Contact point
8 Contact point
9 Plug-in connector

What is claimed is:

1. A heating device for heating an air flow in a motor vehicle, the heating device comprising:
- a plurality of heating rods that have connection plates made of aluminium or an aluminium-based alloy; and
- a circuit board carrying a control circuit to which the heating rods are connected by busbars, wherein the busbars have a body made of aluminium or an aluminium-based alloy that establishes contact with the heating rods by a welded joint, and the busbars have an end piece made of copper or a copper-based alloy that establishes contact with the circuit board by a plug-in connector.

2. The heating device according to claim 1, wherein the end piece forms a contact pin.

3. The heating device according to claim 2, wherein the contact pin is a press-in contact, which is pressed into a corresponding opening in the circuit board.

4. The heating device according to claim 3, wherein the contact pin has a bulging center section, which presses against the wall of the opening.

5. The heating device according to claim 1, wherein the end piece is provided with a metallic coating.

6. The heating device according to claim 5, wherein the metallic coating is tin, or a tin-based alloy.

7. The heating device according to claim 1, wherein the end piece is positively attached in a form fit to the body.

8. The heating device according to claim 1, wherein the end piece is attached to the body by a press joining process.

9. The heating device according to claim 1, wherein the end piece is attached to the body by toxing or clinching.

10. The heating device according to claim 1, wherein the heating rods in each case have a potential connection connected to one of the busbars and an earth connection connected to another of the busbars.

* * * * *